United States Patent
Chua et al.

(10) Patent No.: US 12,400,483 B2
(45) Date of Patent: Aug. 26, 2025

(54) LIVENESS DETECTION METHOD AND SYSTEM THEREOF

(71) Applicant: Realtek Singapore Private Limited, Singapore (SG)

(72) Inventors: Tien-Ping Chua, Singapore (SG); Chen-Feng Kuo, Singapore (SG); Ruchi Mangesh Dhamnaskar, Singapore (SG)

(73) Assignee: REALTEK SINGAPORE PRIVATE LIMITED, Singapore (SG)

( * ) Notice: Subject to any disclaimer, the term of this patent is extended or adjusted under 35 U.S.C. 154(b) by 693 days.

(21) Appl. No.: 17/695,196

(22) Filed: Mar. 15, 2022

(65) Prior Publication Data
US 2023/0206699 A1    Jun. 29, 2023

(30) Foreign Application Priority Data

Dec. 23, 2021 (TW) ................................. 110148551

(51) Int. Cl.
*G06V 40/40* (2022.01)
*G06T 3/608* (2024.01)
(Continued)

(52) U.S. Cl.
CPC .............. *G06V 40/40* (2022.01); *G06T 3/608* (2013.01); *G06T 7/248* (2017.01); *G06V 40/168* (2022.01); *G06T 2207/30201* (2013.01)

(58) Field of Classification Search
CPC ...... G06V 40/40; G06V 40/168; G06T 3/608; G06T 7/248; G06T 2207/30201
See application file for complete search history.

(56) References Cited

U.S. PATENT DOCUMENTS

| | | | |
|---|---|---|---|
| 5,991,429 A | 11/1999 | Coffin et al. | |
| 7,203,346 B2 | 4/2007 | Kim et al. | |

(Continued)

FOREIGN PATENT DOCUMENTS

| CN | 108596135 A | 9/2018 |
|---|---|---|
| CN | 110223322 A | 9/2019 |
| CN | 110309805 A | 10/2019 |
| CN | 112528986 A | 3/2021 |

OTHER PUBLICATIONS

M. De Marsico, M. Nappi, D. Riccio and J.-L. Dugelay, "Moving face spoofing detection via 3D projective invariants," 2012 5th IAPR International Conference on Biometrics (ICB), New Delhi, India, 2012, pp. 73-78, doi: 10.1109/ICB.2012.6199761. (Year: 2012).*

(Continued)

*Primary Examiner* — Chan S Park
*Assistant Examiner* — Paulo Andres Garcia
(74) *Attorney, Agent, or Firm* — McClure, Qualey & Rodack, LLP

(57) ABSTRACT

A liveness detection method includes: obtaining multiple first feature points and multiple second feature points according to a first image, a second image, and a feature point process, wherein the first feature points include two first fixed feature points and at least one first variable feature point, and the second feature points include two second fixed feature points and at least one second variable point; obtaining a first transform function according to the first fixed feature points and the second fixed feature points; obtaining at least one check feature point according to the first transform function and the first variable feature point(s); and determining whether the second image is a spoofing image according to the check feature point(s) and the second variable point(s).

20 Claims, 9 Drawing Sheets

(51) Int. Cl.
  *G06T 7/246* (2017.01)
  *G06V 40/16* (2022.01)

(56) References Cited

U.S. PATENT DOCUMENTS

| | | | | |
|---|---|---|---|---|
| 7,876,931 | B2* | 1/2011 | Geng | G06V 20/64 |
| | | | | 382/118 |
| 8,401,253 | B2* | 3/2013 | Yamada | G06V 40/40 |
| | | | | 382/118 |
| 8,542,879 | B1* | 9/2013 | Nechyba | G06V 40/45 |
| | | | | 382/118 |
| 9,639,740 | B2 | 5/2017 | Ganong et al. | |
| 9,898,674 | B2* | 2/2018 | Connell | G06V 40/171 |
| 2006/0120571 | A1* | 6/2006 | Tu | G06V 40/171 |
| | | | | 382/118 |
| 2011/0254942 | A1* | 10/2011 | Suzuki | G06V 40/16 |
| | | | | 348/E7.087 |
| 2014/0016837 | A1 | 1/2014 | Nechyba et al. | |
| 2018/0096196 | A1* | 4/2018 | Gordon | G06V 40/176 |
| 2018/0239955 | A1* | 8/2018 | Rodriguez | G06V 40/171 |
| 2018/0276489 | A1* | 9/2018 | Xu | G06V 10/82 |
| 2019/0050678 | A1 | 2/2019 | Shen et al. | |
| 2019/0188867 | A1* | 6/2019 | Jiang | G06V 40/174 |
| 2020/0118276 | A1* | 4/2020 | Whang | G06T 7/246 |
| 2020/0175260 | A1 | 6/2020 | Cheng et al. | |
| 2021/0264183 | A1* | 8/2021 | Wolf | G06V 20/64 |
| 2023/0267612 | A1* | 8/2023 | Helmer | G06T 7/62 |
| | | | | 382/128 |

OTHER PUBLICATIONS

Https://web.archive.org/web/20171226115739/https://ags.cs.uni-kl.de/fileadmin/inf_ags/3dcv-ws11-12/3DCV_WS11-12_lec04.pdf(Year: 2017).*

A. Naitsat and Y. Y. Zeevi, "Face anti-spoofing based on projective invariants," 2018 IEEE International Conference on the Science of Electrical Engineering in Israel (ICSEE), Eilat, Israel, 2018, pp. 1-5, doi: 10.1109/ICSEE.2018.8646223. (Year: 2018).*

D. Acevedo, P. Negri, M. E. Buemi and M. Mejail, "Facial expression recognition based on static and dynamic approaches," 2016 23rd International Conference on Pattern Recognition (ICPR), Cancun, Mexico, 2016, pp. 4124-4129, doi: 10.1109/ICPR.2016.7900280. (Year: 2016).*

MCRO v. Bandai citation (Year: 2016).*

K. Patel, H. Han and A. K. Jain, "Secure Face Unlock: Spoof Detection on Smartphones," in IEEE Transactions on Information Forensics and Security, vol. 11, No. 10, pp. 2268-2283, Oct. 2016, doi: 10.1109/TIFS.2016.2578288. (Year: 2016).*

Ming Z, Visani M, Luqman MM, Burie J-C. A Survey on Anti-Spoofing Methods for Facial Recognition with RGB Cameras of Generic Consumer Devices. Journal of Imaging. 2020; 6(12):139. https://doi.org/10.3390/jimaging6120139 (Year: 2020).*

Jianwei Yang and Zhen Lei and Stan Z. Li, Learn Convolutional Neural Network for Face Anti-Spoofing, Aug. 26, 2014, https://arxiv.org/abs/1408.5601 (Year: 2014).*

"A Face Spoofing Detection Method based on Domain Adaptation and Lossless Size Adaptation"; 2017.

"Compute epipolar lines for stereo images", Accessed Mar. 14, 2022.

"Eight-point algorithm"—Wikipedia Accessed Mar. 14, 2022.

"Face Spoofing Detection Based on Local Ternary Label Supervision in Fully Convolutional Networks"; vol. 15, 2020.

"Face Spoofing Detection Using Colour Texture Analysis"; Aug. 2017.

"Image Alignment and Stitching: A Tutorial1"; Dec. 10, 2006.

"Learning Deep Models for Face Anti-Spoofing: Binary or Auxiliary Supervision" *(2018).

"Project 3:Camera Calibration and Fundamental Matrix Estimation with RANSAC"; Oct. 10, 2016.

* cited by examiner

LIVENESS DETECTION METHOD AND SYSTEM THEREOF

CROSS-REFERENCE TO RELATED APPLICATION

This non-provisional application claims priority under 35 U.S.C. § 119(a) to Patent Application No. 110148551 filed in Taiwan, R.O.C. on Dec. 23, 2021, the entire contents of which are hereby incorporated by reference.

BACKGROUND

Technical Field

The present application relates to a facial recognition technology, in particular, a liveness detection method and system thereof.

Related Art

Various applications of facial recognition technology are gradually increasing, and considering that different usage scenarios have different requirements for privacy and security levels, the application requirements of anti-spoofing technology, such as liveness detection, are born accordingly. In this way, not only biological features (such as facial features) can be detected, but also whether a person in the image to be recognized is a true person or not can be identified, thereby the occurrence of using photos or videos for spoofing can be avoided.

However, an edge device equipped with a facial recognition function generally has fewer computing resources and memory resources, and the facial recognition function has occupied most of the computing resources and memory resources of the edge device. Therefore, if a liveness detection function requires greater computing resources and memory resources, it may cause the edge device to be unable to support the computing resources and memory resources required by the liveness detection function. In other words, the edge device may not be able to load the liveness detection function, thereby the occurrence of spoofing cannot be prevented.

SUMMARY

In view of the above, a liveness detection method and system thereof are provided in the present application. According to some embodiments, the liveness detection method includes: obtaining two first fixed feature points and at least one first variable feature point according to a first image and a feature point process; obtaining two second fixed feature points and at least one second variable feature point according to a second image and the feature point process; obtaining a first transform function according to the first fixed feature points and the second fixed feature points; obtaining at least one check feature point according to the first transform function and the at least one variable feature points; and determining whether the second image is a spoofing image according to the at least one check feature point and the at least one second variable feature point.

According to some embodiments, a liveness detection system includes a non-transitory storage medium and a processor. The processor is electrically connected to the non-transitory storage medium. The non-transitory storage medium is configured to store a program. The processor is configured to load the program to perform the following steps: obtaining two first fixed feature points and at least one first variable feature point according to a first image and a feature point process; obtaining two second fixed feature points and at least one second variable feature point according to a second image and the feature point process; obtaining a first transform function according to the first fixed feature points and the second fixed feature points; obtaining at least one check feature point according to the first transform function and the at least one first variable feature point; and determining whether the second image is a spoofing image according to the at least one check feature point and the at least one second variable feature point.

According to some embodiments, a liveness detection method includes: obtaining a plurality of first feature points according to a first image and a feature point process; obtaining a plurality of second feature points according to a second image and the feature point process; obtaining a fourth transform function according to the first feature points and the second feature points; and determining the second image is a liveness image when the fourth transform function does not meet a predetermined constraint, wherein the predetermined constraint comprises an epipolar constraint and an affine constraint.

To sum up, according to some embodiments, the first transform function and the fourth transform function can be obtained through a simple operation, and whether a person image to be recognized is a spoofing image can be determined according to the first transform function and the fourth transform function, thereby determining whether the behavior of using photos or videos for spoofing occurs. In other words, while realizing the determination of the spoofing behavior, the computing resources and memory resources required for performing the determination of the spoofing behavior can also be reduced.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
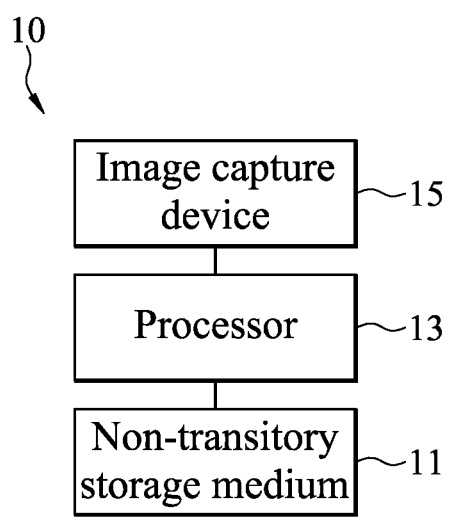
FIG. 1 illustrates a schematic block diagram of a liveness detection system according to some embodiments of the present application.
Figure 9A:
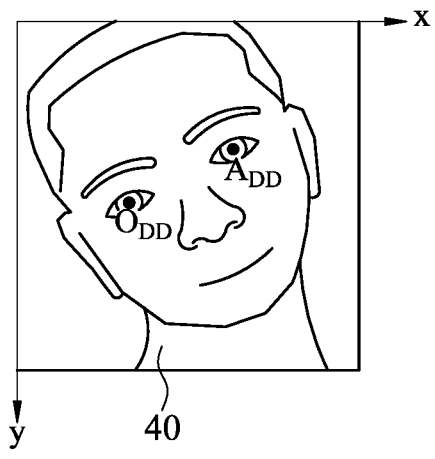

Refer to FIG. 1, illustrating a schematic block diagram of a liveness detection system 10 according to some embodiments of the present application. The liveness detection system 10 includes a non-transitory storage medium 11 and a processor 13. In some embodiments, the liveness detection system 10 further includes an image capture device 15. The processor 13 is electrically connected to the non-transitory storage medium 11 and the image capture device 15. The image capture device 15 is configured to photograph a user (specifically, the user's face) to generate a video signal of a set of continuous frames. For example, the video signal is 60 continuous frames per second. Wherein, each frame is an original image 40 (as shown in FIG. 9A). The non-transitory storage medium 11 stores a program for the processor 13 to perform, according to the frames, the liveness detection method of the present application after loading. In this way, whether the user is a true person or a fake person is determined. Wherein, the fake person may be a user who uses a mask to fake or a user who uses a photo to fake, and the true person refers to the user himself/herself.

In some embodiments, the process 13 may be an operation circuit such as a central processing unit, a microprocessor, an application-specific integrated circuit (ASIC), or a system on a chip (SOC).

Figure 2:
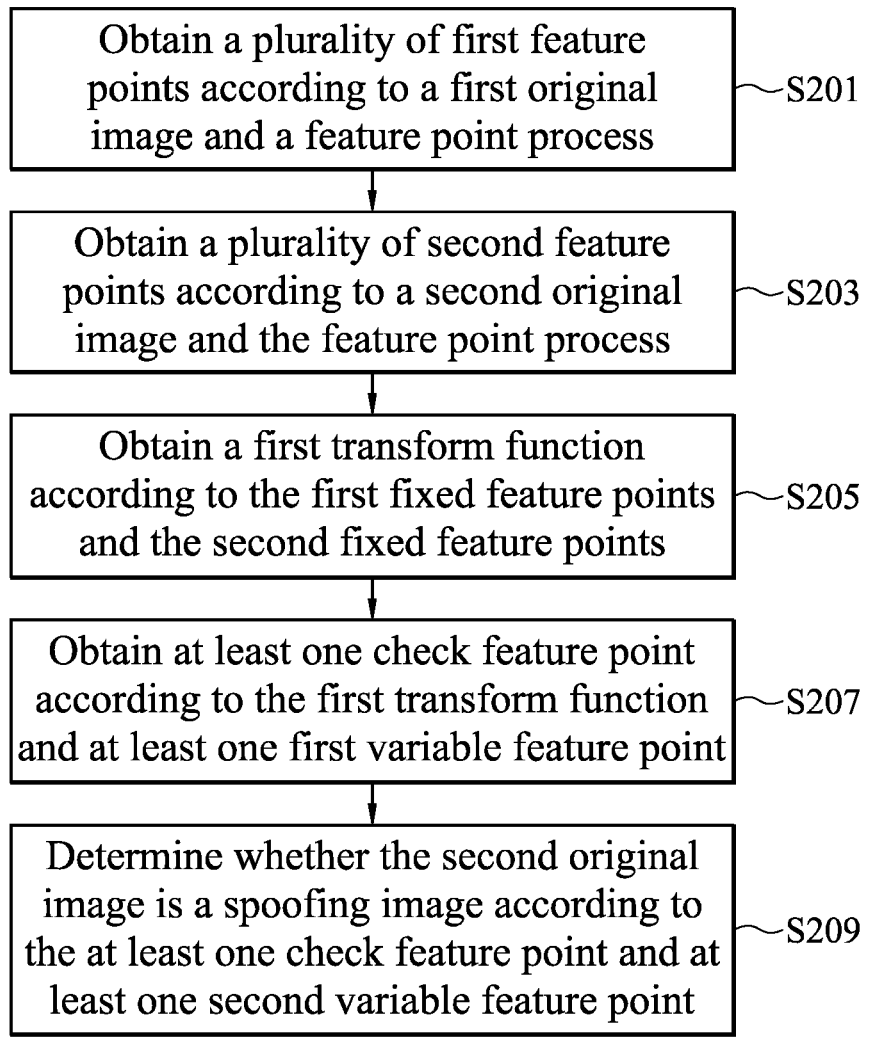
FIG. 2 illustrates a schematic flow diagram of a liveness detection method according to some embodiments of the present application.
Figure 3A:
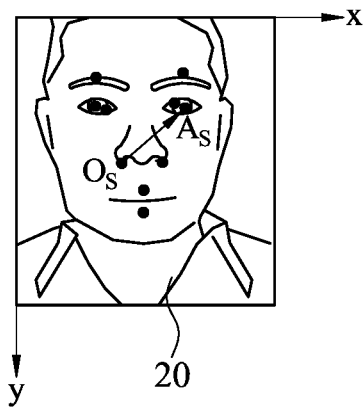
FIGS. 3A-3B illustrate a schematic diagram of a first original image and a second original image according to some embodiments of the present application.
Figure 3B:
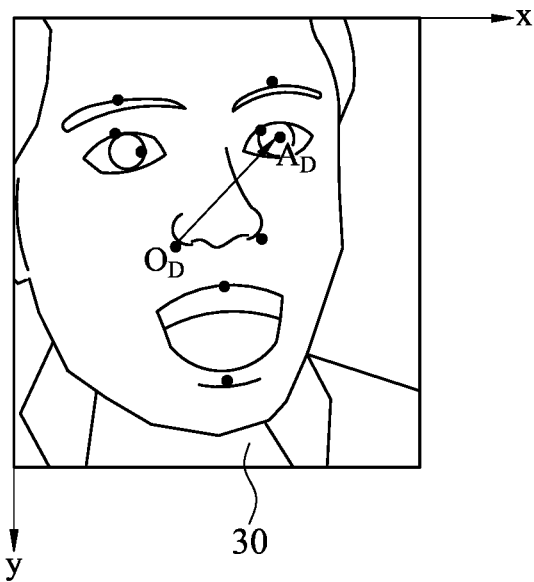

Refer to FIG. 2, illustrating a schematic flow diagram of a liveness detection method according to some embodiments of the present application. First, the processor 13 obtains a plurality of first feature points according to a first image (hereinafter referred to as a first original image 20, as shown in FIG. 3A) and a feature point process (step S201) and obtains a plurality of second feature points according to a second image (hereinafter referred to as a second original image 30, as shown in FIG. 3B) and the feature point process (step S203). The plurality of first feature points include two first fixed feature points and at least one first variable feature point. The plurality of second feature points include two second fixed feature points and at least one second variable feature point. The first original image 20 may be the first frame among the aforementioned continuous frames, and any one of the remaining successive frames may be the second original image 30, but the present application is not limited thereto. The first original image 20 may be one frame whose order after the second one among the aforementioned continuous frames, and any frame following the first original image 20 may be the second original image 30.

The feature point process can be implemented by a convolutional neural network (CNN). For example, the designer can input multiple sample images including a human face to the processor 13 through an I/O interface (such as a keyboard, a mouse, an image transmission interface, etc.) (not shown). The processor 13 performs, according to the sample images, a machine learning training of the image features (such as histograms of oriented gradients (HOG) features, Haar-like feature (Haar), and so on) to determine determination logic (hereinafter referred to as first determination logic). The machine learning training of the image features related to face detection may be a known or self-developed model, and the details are omitted here. The processor 13 can perform, according to the first determination logic, face detection on the first original image 20 and the second original image 30 to determine whether there is a human face in the first original image 20 and the second original image 30 and outlines the face positions in the first original image 20 and the second original image 30 (hereinafter the first original image 20 with the face position be outlined is referred to as a first outlined image, and the second original image 30 with the face position be outlined is referred to as a second outlined image). The designer can also input multiple sample images with the face position being outlined (hereinafter referred to as face-outlined sample images) to the processor 13 through the I/O interface. The processor 13 performs the machine learning training of the feature points according to the face-outlined sample images to determine determination logic (hereinafter referred to as second determination logic). The machine learning training of the feature points may be a known or self-developed model, and the details are omitted here. The processor 13 can detect, according to the second determination logic, the feature points of the human face in the images (e.g., the first outlined image and the second outlined image). The feature points, such as but are not limited to eyebrow peaks, eyeballs, nostrils, the middle of the upper lip, the middle of the lower lip, etc.

Compared with the first variable feature points and the second variable feature points, the first fixed feature points and the second fixed feature points are less susceptible to change with expressions. For example, the first fixed feature points and the second fixed feature points may be the eyeballs, nostrils, and the middle of the upper lip, and the first variable feature points and the second variable feature points may be the eyebrow peaks and the middle of the lower lip. In some embodiments, the first fixed feature points and the second fixed feature points correspond to the same feature of the face. For example, the two first fixed feature points and the two second fixed feature points both correspond to the two eyeballs of the face. The first variable feature points and the second variable feature points may correspond to the same feature of the face. For example, the first variable feature points and the second variable feature points both correspond to the same eyebrow peaks of the face.

In some embodiments, the sequence of step S203 and step S201 may be reversed. In this embodiment, before performing step S201, the processor 13 can store the first original image 20 in the non-transitory storage medium 11 for the processor 13 to perform step S201 subsequently.

In some embodiments, the number of the first variable feature points is the same as or different from the number of the second variable feature points. In some embodiments, the number of the first variable feature points and the number of the second variable feature points are both greater than a number threshold. In some embodiments, if the number of the first variable feature points is not greater than the number threshold, the processor 13 controls the image capture device 15 to generate another video signal, having a new set of continuous frames (hereinafter referred to as another set of frames), and the processor 13 re-performs the feature point process on a first original image 20 in another set of frames until the number of the first variable feature points obtained from the single first original image 20 is greater than the number threshold. In some embodiments of step S203, under the condition that the number of the first variable feature points is greater than the number threshold, if the number of the second variable feature points obtained from the second image 30 is not greater than the number threshold, the processor 13 repeats selecting another second original image 30 from the frames following the first original image 20, and performs the feature point process on another second original image 30 until the number of the second variable feature points obtained from the single second original image 30 is greater than the number threshold. In a single set of frames, under the condition that all the frames following the first original image 20 have been selected, when the number of the second variable feature points obtained from the single second original image 30 is still not greater than the number threshold, the processor 13 controls the image capture device 15 to generate another video signal having another set of frames, and the processor 13 repeats step S201 according to another set of frames. The number threshold may be stored in the non-transitory storage medium 11 in advance.

Refer again to FIG. 2. After obtaining the first fixed feature points, the at least one first variable feature point, the second fixed feature points, and the at least one second variable feature point, the processor 13 obtains a transform function (hereinafter referred to as a first transform function) according to the first fixed feature points and the second fixed feature points (step S205). For example, the processor 13 can perform translation operation, rotation operation, and scaling operation on the coordinate vectors of the first fixed feature points so as to convert the first fixed feature points to the second fixed feature points, and integrates the translation operation, the rotation operation, and the scaling operation to form the first transform function.

Figure 4:
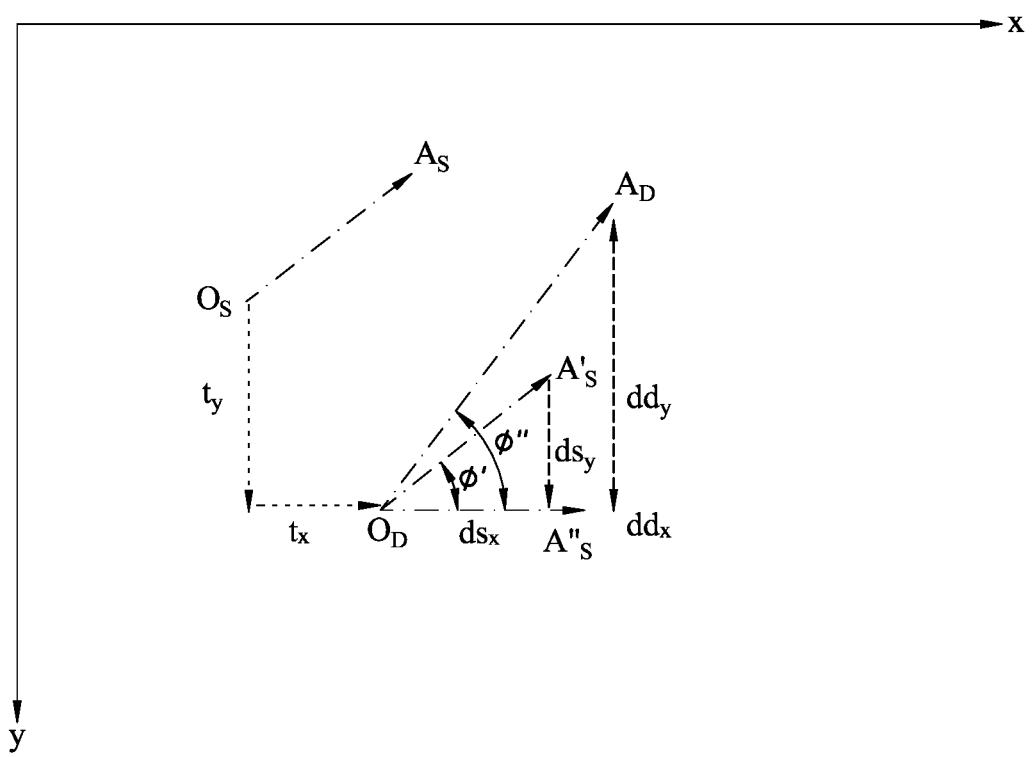
FIG. 4 illustrates a schematic diagram of the conversion of a first transform function according to some embodiments of the present application.

Refer to FIGS. 3A-3B and FIG. 4. FIGS. 3A-3B illustrate a schematic diagram of a first original image 20 and a second original image 30 according to some embodiments of the present application. FIG. 4 illustrates a schematic diagram of the conversion of a first transform function according to some embodiments of the present application. In some embodiments, the first transform function can be represented by equation 1. Equation 1 can be derived from equation 2 to equation 8. Wherein, $O_S$ and $A_S$ are the first fixed feature points from the first original image 20, $O_D$ and $A_D$ are the second fixed feature points from the second original image 30, $t_x$ is a horizontal translation amount of $O_S$ and $A_S$, and $t_y$ is a vertical translation amount of $O_S$ and $A_S$. $\overrightarrow{O_D A'_S}$ is the vector of $\overrightarrow{O_S A_S}$ after translation. $\overrightarrow{O_D A''_S}$ is the vector of $\overrightarrow{O_D A'_S}$ after rotation, and ø' is the angle between $\overrightarrow{O_D A''_S}$ and $\overrightarrow{O_D A'_S}$. $\overrightarrow{O_D A''_S}$ is then converted to $\overrightarrow{O_D A_D}$ after being rotated and scaled. ø" is the angle between $\overrightarrow{O_D A_D}$ and $\overrightarrow{O_D A''_S}$. $ds_x$ is a horizontal component of the vectors of $O_S$ and $A_S$, $ds_y$ is a vertical component of the vectors of $O_S$ and $A_S$, $dd_x$ is a horizontal component of the vectors of $O_D$ and $A_D$, and $dd_y$ is a vertical component of the vectors of $O_D$ and $A_D$. x is the horizontal axis, and y is the vertical axis.

$$\overrightarrow{O_D A_D} = \begin{bmatrix} rs0 & -rs1 \\ rs1 & rs0 \end{bmatrix} \left( \overrightarrow{O_S A_S} + \begin{bmatrix} t_x \\ t_y \end{bmatrix} \right) \quad \text{Equation (1)}$$

$$\overrightarrow{O_D A'_S} = \overrightarrow{O_S A_S} + \begin{bmatrix} t_x \\ t_y \end{bmatrix} \quad \text{Equation (2)}$$

$$\overrightarrow{O_D A''_S} = \begin{bmatrix} \cos\phi' & -\sin\phi' \\ \sin\phi' & \cos\phi' \end{bmatrix} \overrightarrow{O_D A'_S} \quad \text{Equation (3)}$$

$$\overrightarrow{O_D A_D} = \begin{bmatrix} S & 0 \\ 0 & S \end{bmatrix} \begin{bmatrix} \cos\phi'' & \sin\phi'' \\ -\sin\phi'' & \cos\phi'' \end{bmatrix} \overrightarrow{O_D A''_S} \quad \text{Equation (4)}$$

$$\begin{bmatrix} rs0 & -rs1 \\ rs1 & rs0 \end{bmatrix} = \begin{bmatrix} S & 0 \\ 0 & S \end{bmatrix} \begin{bmatrix} \cos\phi'' & \sin\phi'' \\ -\sin\phi'' & \cos\phi'' \end{bmatrix} \begin{bmatrix} \cos\phi' & -\sin\phi' \\ \sin\phi' & \cos\phi' \end{bmatrix} \quad \text{Equation (5)}$$

$$S = \frac{\sqrt{dd_x^2 + dd_y^2}}{\sqrt{ds_x^2 + ds_y^2}} \quad \text{Equation (6)}$$

$$rs0 = \frac{ds_x * dd_x + ds_y * dd_y}{ds_x^2 + ds_y^2} \quad \text{Equation (7)}$$

$$rs1 = \frac{ds_x * dd_y - ds_y * dd_x}{ds_x^2 + ds_y^2} \quad \text{Equation (8)}$$

Refer again to FIG. 2. After obtaining the first transform function, the processor 13 obtains at least one check feature point according to the first transform function and the at least one first variable feature point (step S207). Specifically, through the first transform function, the first variable feature points are converted to the check feature points. In this way, the check feature points and the second variable feature points are under the same coordinate reference. In some embodiments, there is a first distance between the two first fixed feature points and a second distance between the two second fixed feature points. The first distance is the same as or different from the second distance. Since the first transform function can be a vector function, the accuracy of the conversion of the first variable feature point to the check feature point by the first transform function can be improved through the first distance and the second distance.

In some embodiments, the first transform function can be represented by equation 9, and equation 1 is substantially the same as equation 9. Wherein, rs0, rs1, $t_x$, and $t_y$ are the same as those in equation 1 and will not be repeated. $dc_x$ is a horizontal coordinate of the at least one check feature point, $dc_y$ is a vertical coordinate of the at least one check feature point, $sc_x$ is a horizontal coordinate of the at least one first variable feature point, and $sc_y$ is a vertical coordinate of the at least one first variable feature point.

$$\begin{bmatrix} dc_x \\ dc_y \end{bmatrix} = \begin{bmatrix} rs0 & -rs1 \\ rs1 & rs0 \end{bmatrix} \begin{bmatrix} sc_x \\ sc_y \end{bmatrix} + \begin{bmatrix} t_x \\ t_y \end{bmatrix} \quad \text{Equation (9)}$$

In some embodiments, the first transform function can be represented by equation 10, and equation 10 is substantially the same as equation 9. Wherein, rs0, rs1, $t_x$, $t_y$, $dc_x$, $dc_y$, $sc_x$, and $sc_y$ are the same as those in equation 9 (or equation 1) and will not be repeated.

$$\begin{bmatrix} dc_x \\ dc_y \\ 1 \end{bmatrix} = \begin{bmatrix} rs0 & -rs1 & t_x \\ rs1 & rs0 & t_y \\ 0 & 0 & 1 \end{bmatrix} \begin{bmatrix} sc_x \\ sc_y \\ 1 \end{bmatrix} \quad \text{Equation (10)}$$

After obtaining the at least one check feature point, the processor 13 determines whether the second original image is a spoofing image according to the at least one check feature point and at least one second variable feature point (step S209). For example, since the check feature points and the second variable feature points are under the same coordinate reference, by comparing whether the coordinates of the check feature points are matched with the coordinates of the second variable feature points, it is determined whether the second original image 30 is a spoofing image or not. Specifically, when the coordinates of the check feature points are matched with the coordinates of the second variable feature points, it represents that the expression of the face in the second original image 30 has not changed and the face has not rotated, then the processor 13 determines that the second original image 30 is a spoofing image. In other words, the second original image 30 may be obtained by impersonating the user through a photo, thus there is no expression change and no face rotation. When the coordinates of the check feature points do not match with the coordinates of the second variable feature points, it represents that the expression of the face in the second original image 30 has changed or the face has rotated, then the processor 13 determines that the second original image 30 is a true man image.

In some embodiments of step S209, the check feature points and the second variable feature points may be multiple. The processor 13 determines whether the second original image 30 is a spoofing image according to multiple check feature points and the second variable feature points corresponding to the same facial feature. The multiple check feature points and the second variable feature points corresponding to the same facial feature may be part of the check feature points and second variable feature points, or all of the check feature points and second variable feature points.

In some embodiments of step S209, the processor 13 determines that the second original image 30 is a spoofing image when a difference degree between at least one check feature point and at least one second variable feature point is smaller than a difference threshold. Specifically, when the difference degree is smaller than the difference threshold, it represents that the expression of the face in the second original image 30 has not changed and the face has not rotated. In other words, the second original image 30 may be obtained by impersonating the user through a photo (i.e., a spoofing image). The difference degree may be the Euclidean distance between the check feature points and the second variable feature points under the same coordinate reference. In some embodiments, the difference degree may be the Euclidean distance between the check feature points and the second variable feature points corresponding to the same facial feature under the same coordinate reference. The difference threshold may be stored in the non-transitory storage medium 11 in advance.

In some embodiments, step S205-S209 may be implemented by a correlation operation of a similarity constraint.

In some embodiments, the first transform function can be calculated through simple operations (such as addition, subtraction, multiplication, and division), thus it can reduce the computing resources and memory resources needed for determining whether the second original image 30 is a spoofing image.

Figure 5:
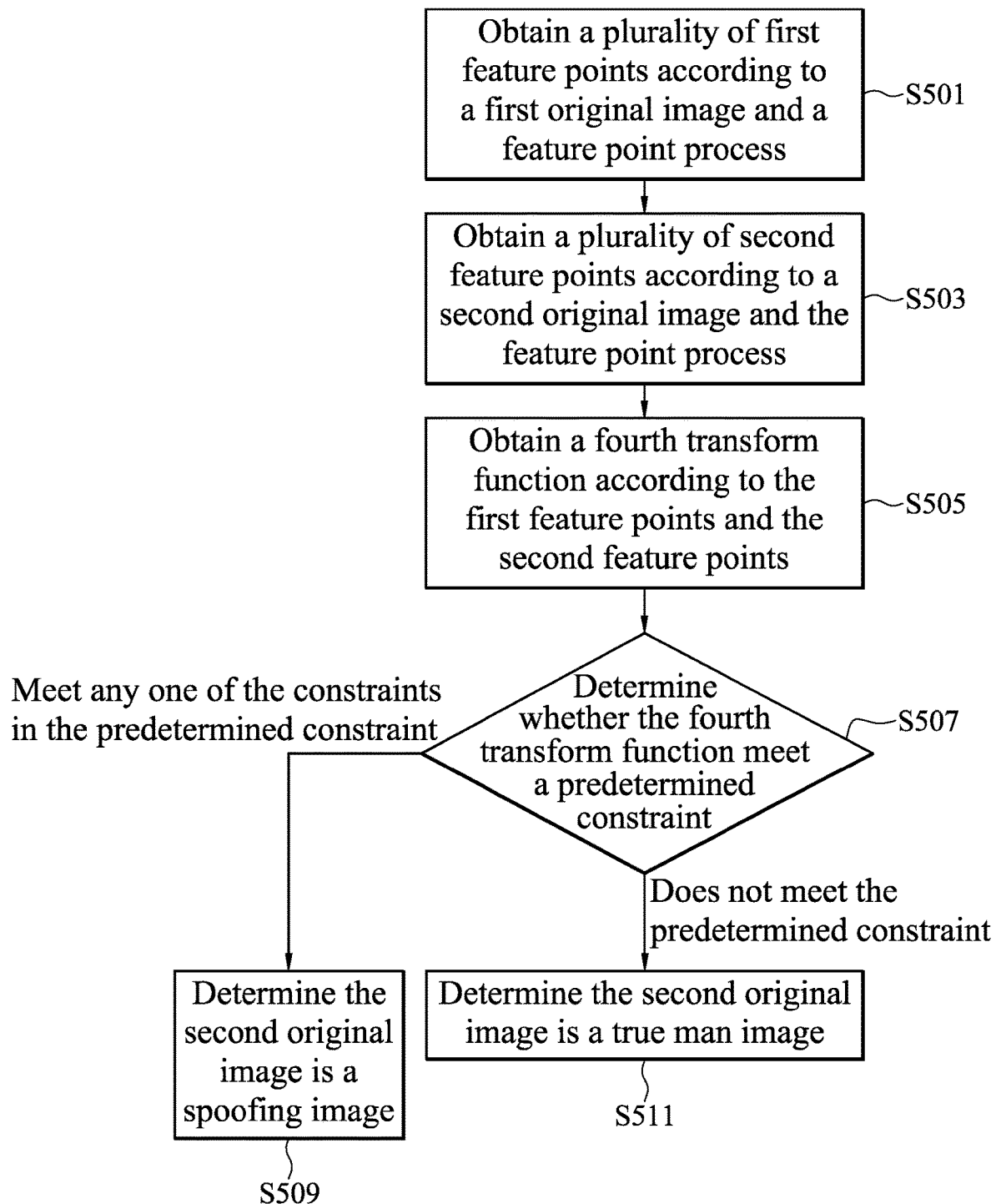
FIG. 5 illustrates a schematic flow diagram of a liveness detection method according to some embodiments of the present application.

Refer to FIG. 5, illustrating a schematic flow diagram of a liveness detection method according to some embodiments of the present application. Since steps S501 and S503 are the same as steps S201 and S203, thus will not be repeated. In some embodiments, after obtaining the first feature points and the second feature points, the processor 13 obtains a transform function (hereinafter referred to as a fourth transform function) according to the first feature points and the second feature points (step S505). The fourth transform function can be implemented by a transformation matrix. For example, the processor 13 performs linear transformation on the first feature points and the second feature points to generate the fourth transform function. Specifically, the processor 13 can calculate the fourth transform function according to equation 11. Wherein, $I_2$ is the coordinates of the second feature points, and $I_1$ is the coordinates of the first feature points. T is the fourth transform function (e.g., an m×n transformation matrix, where m and n are 2 under two-dimensional coordinates, and m and n are 3 under homogeneous coordinates). In some embodiments of step S505, the processor 13 obtains the fourth transform function according to multiple first feature points and second feature points corresponding to the same facial feature. The multiple first feature points and second feature points corresponding to the same facial feature may be part of the first feature points and second feature points or all of the first feature points and second feature points.

$$I_2 = TI_1 \qquad \text{Equation (11)}$$

Next, the processor 13 determines whether the fourth transform function meet a predetermined constraint (step S507). The predetermined constraint comprises an epipolar constraint and an affine constraint. When the fourth transform function meets any one of the constraints of the predetermined constraint, the processor 13 determines that the second original image 30 is a spoofing image (step S509). When the fourth transform function does not meet the predetermined constraint (specifically, when the fourth transform function does not meet all the constraints of the predetermined constraint), the processor 13 determines that the second original image 30 is a true man image (step S511). For example, when the fourth transform function meets the epipolar constraint (as shown in equation 12), the second original image 30 is the epipolar geometry of the first original image 20, and compared with the first original image 20, the expression of the face in the second image 30 has not changed. Specifically, the second original image 30 may be obtained by impersonating the user through a mask, thus there is no expression change, and the processor 13 determines that the second original image 30 is a spoofing image. For another example, when the fourth transform function meets the affine constraint (as shown in equation 13 or equation 14), the second original image 30 is the affine geometry of the first original image 20, and compared with the first original image 20, the expression of the face in the second image 30 has not changed and the face has not rotated. Specifically, the second original image 30 may be obtained by impersonating the user through a photo, thus there is no expression change and no face rotation, and the processor 13 determines that the second original image 30 is a spoofing image.

$$I_2^T t \times RI_1 = 0 \qquad \text{Equation (12)}$$

Wherein, $I_2$ is the coordinates of the second feature points, $I_1$ is the coordinates of the first feature points, $I_2^T$ is a transpose matrix of $I_2$, t is a translation vector, and R is a rotation matrix.

$$\begin{bmatrix} \alpha & \beta & cx \cdot (1-\alpha) - cy \cdot \beta \\ -\beta & \alpha & cx \cdot \beta + (1-\alpha) \cdot cy \end{bmatrix} \qquad \text{Equation (13)}$$

$$\begin{bmatrix} \alpha & \beta & cx \cdot (1-\alpha) - cy \cdot \beta \\ -\beta & \alpha & cx \cdot \beta + (1-\alpha) \cdot cy \\ 0 & 0 & 1 \end{bmatrix} \qquad \text{Equation (14)}$$

$$\alpha = scl * \cos\theta \qquad \text{Equation (15)}$$

$$\beta = scl * \sin\theta \qquad \text{Equation (16)}$$

Wherein, cx and cy are the horizontal and vertical coordinates of the rotation center, respectively, scl is a scaling scale, and θ is the rotation radian.

When the fourth transform function does not meet the predetermined constraint, it represents that the second original image 30 is not a kind of geometric deformation of the first original image 20. In other words, the expression of the face in the second original image 30 may have changed. That is, the second original image 30 is photographed by a real person. Therefore, under this condition, the processor 13 determines that the second original image 30 is a true man image.

In some embodiments, the fourth transform function can be calculated through simple operations (such as addition, subtraction, multiplication, and division), thus it can reduce the computing resources and memory resources needed for determining whether the second original image 30 is a spoofing image.

In some embodiments, the first transform function is different from the fourth transform function. In other words, different determination conditions can be respectively formed based on the first transform function and the fourth transform function (e.g., steps S209 and S507). In this way, the accuracy of detecting whether the second original image 30 is a spoofing image can be improved.

Figure 6:
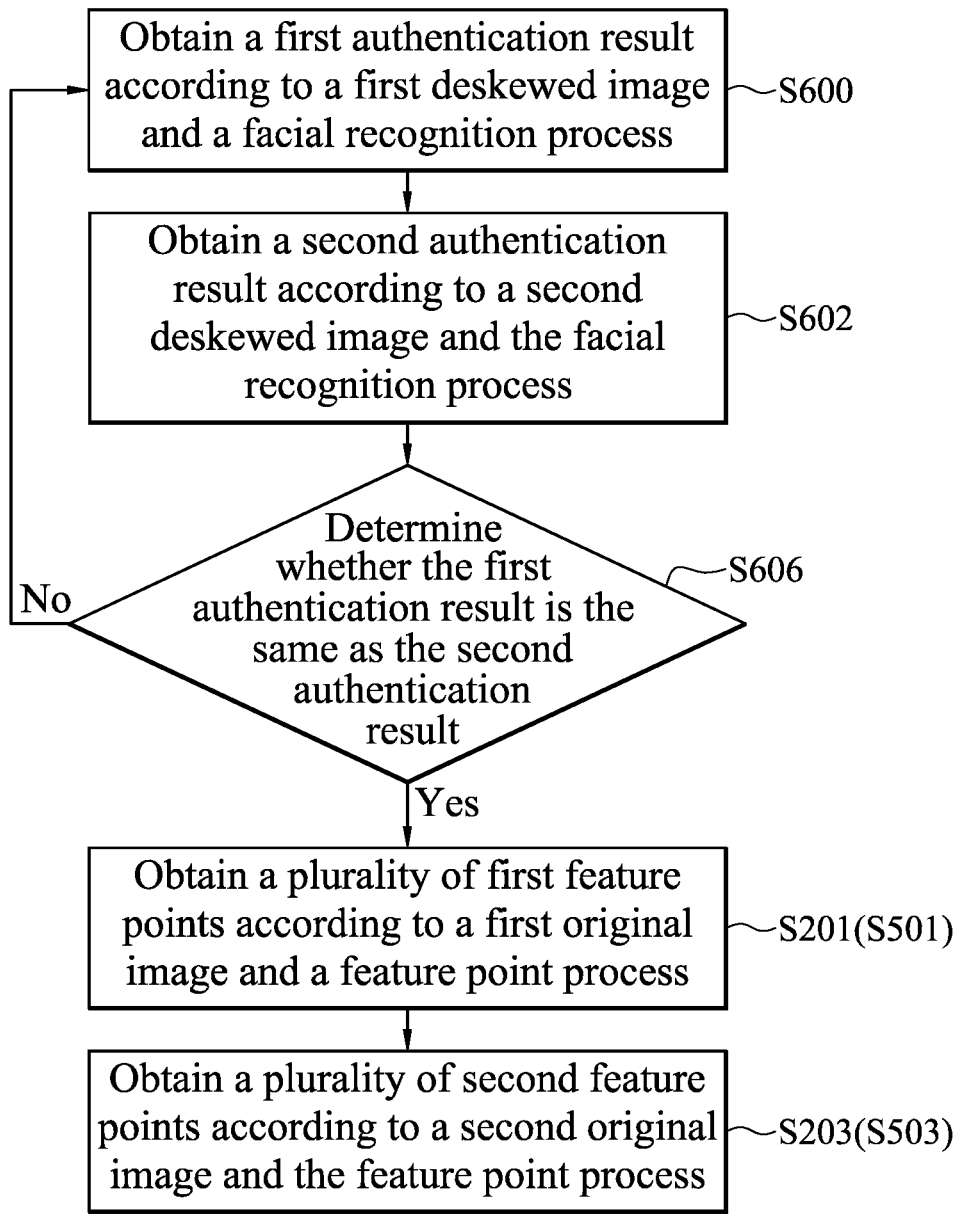
FIG. 6 illustrates a schematic flow diagram of a liveness detection method according to some embodiments of the present application.

Refer to FIG. 6, illustrating a schematic flow diagram of a liveness detection method according to some embodiments of the present application. In some embodiments, before obtaining the first feature points and the second feature points (or, before obtaining the first fixed feature points and the at least one first variable feature point and before obtaining the second fixed feature points and the at least one second variable feature point), the processor 13 performs steps S600-S606. First, the processor 13 obtains a first authentication result according to a first deskewed image and a facial recognition process (step S600). Next, the processor 13 obtains a second authentication result according to a second deskewed image and the facial recognition process (step S602).

The first deskewed image is obtained by performing a deskew process (described in detail later) on the first original image 20, and the second deskewed image is obtained by performing the deskew process on the second original image 30. For example, a frame before the deskew process is an original image 40 (as shown in FIG. 9A), and the face in the original image 40 may be too small, too large, or oblique. If the facial recognition is directly performed on the original image 40, it may cause the error of facial recognition to increase. The deskew process can appropriately enlarge, reduce, and rotate the original image 40 to generate a deskewed image 50 with the face in a proper size and correction direction (as shown in FIG. 9C). For example, the face in the deskewed image 50 is not oblique, occupies two-thirds of the layout of the deskewed image 50, and is located in the center of the deskewed image 50. In this way, the accuracy of the facial recognition process can be improved.

The facial recognition process can be implemented by a convolutional neural network. For example, the designer can input multiple sample images with marked feature points and the face has been deskewed (hereinafter referred to as feature-point-deskewed sample images) to the processor 13 through the I/O interface. The processor 13 performs the machine learning training of facial recognition according to the feature-point-deskewed sample images, so as to determines a determination logic (hereinafter referred to as third determination logic). The machine learning training of facial recognition may be a known or self-developed model, and the details are omitted here. According to the third determination logic, the processor 13 can performs facial recognition on the images (such as the first deskewed image and the second deskewed image) to generate the facial description vectors associated with the images (such as a first facial description vector associated with the first deskewed image and a second facial description vector associated with the second deskewed image). Wherein, each face corresponds to one facial description vector, and different faces correspond to different facial description vectors. In other words, if the face in the first deskewed image is different from the face in the second deskewed image, the first facial description vector is different from the second facial description vector. In some embodiments, the facial description vectors can be implemented by using floating numbers. For example, the facial description vectors may be 128-bit or 256-bit floating numbers. In some embodiments, the first determination logic, the second determination logic, and the third determination logic are different from each other.

The non-transitory storage medium 11 can store a plurality of registered facial description vectors, and the registered facial description vectors respectively correspond to a plurality of users who have been registered to the liveness detection system 10 (hereinafter referred to as registered users). The processor 13 determines whether the first facial description vector matches any one of the registered facial description vectors in the non-transitory storage medium 11. If the first facial description vector matches any one of the registered facial description vectors, it represents that the face in the first deskewed image matches the face of one of the registered users, and the processor 13 uses the first facial description vector as the first authentication result. If the first facial description vector does not match any one of the registered facial description vectors, it represents that the face in the first deskewed image does not match the face of any registered users, the processor 13 generates an authentication failure instruction as the first authentication result.

Similar to the first authentication result, the processor 13 determines whether the second facial description vector matches any one of the registered facial description vectors in the non-transitory storage medium 11. If the second facial description vector matches any one of the registered facial description vectors, it represents that the face in the second deskewed image matches the face of one of the registered users, and the processor 13 uses the second facial description vector as the second authentication result. If the second facial description vector does not match any one of the registered facial description vectors, it represents that the face in the second deskewed image does not match the face of any registered users, the processor 13 generates an authentication failure instruction as the second authentication result.

In some embodiments, the processor 13 can perform a Euclidean distance operation or a cosine similarity operation on the first facial description vector and the registered facial description vectors (or the second facial description vector and the registered facial description vectors) to obtain a comparison parameter. When the comparison parameter is less than a comparison threshold, it represents that the first facial description vector matches the registered facial description vector (or the second facial description vector matches the registered facial description vector). When the comparison parameter is not less than the comparison threshold, it represents that the first facial description vector does not match the registered facial description vectors (or the second facial description vector does not match the registered facial description vectors). The comparison parameter can be stored in the non-transitory storage medium 11 in advance.

After obtaining the first authentication result and the second authentication result, the processor 13 can determine whether the first authentication result is the same as the second authentication result (step S606). For example, the processor 13 determines whether the first facial description vector of the first authentication result is the same as the second facial description vector of the second authentication result. In other words, the processor 13 determines whether the first facial description vector and the second facial description vector match the facial description vector of the same registered user. When the first authentication result is the same as the second authentication result (e.g., the first facial description vector is the same as the second facial description vector), the processor 13 performs the steps of obtaining the first feature points and the second feature points (i.e., steps S201-S203 or steps S501-S503). When the first authentication result is different from the second authentication result, the processor 13 repeats the step of obtaining the first authentication result (i.e., step S600). For example, the processor 13 controls the image capture device 15 to generate another video signal having another set of frames, and the processor 13 re-obtains another first deskewed image according to the another set of frames. The processor 13 performs the facial recognition process on the another first deskewed image to generate a new first authentication result and performs step S602 and steps following it according to the another set of frames. In this way, it can be ensured that the detection of a real or fake person is performed under the condition that the second original image 30 is photographed from a registered user. That is to say, the computing resources and memory resources consumed by the processor 13 for the detection of a real or fake person can be reduced (for example, the detection of a real or fake person does not need to be performed under the condition that the second original image 30 is not photographed from a registered user).

Figure 7:
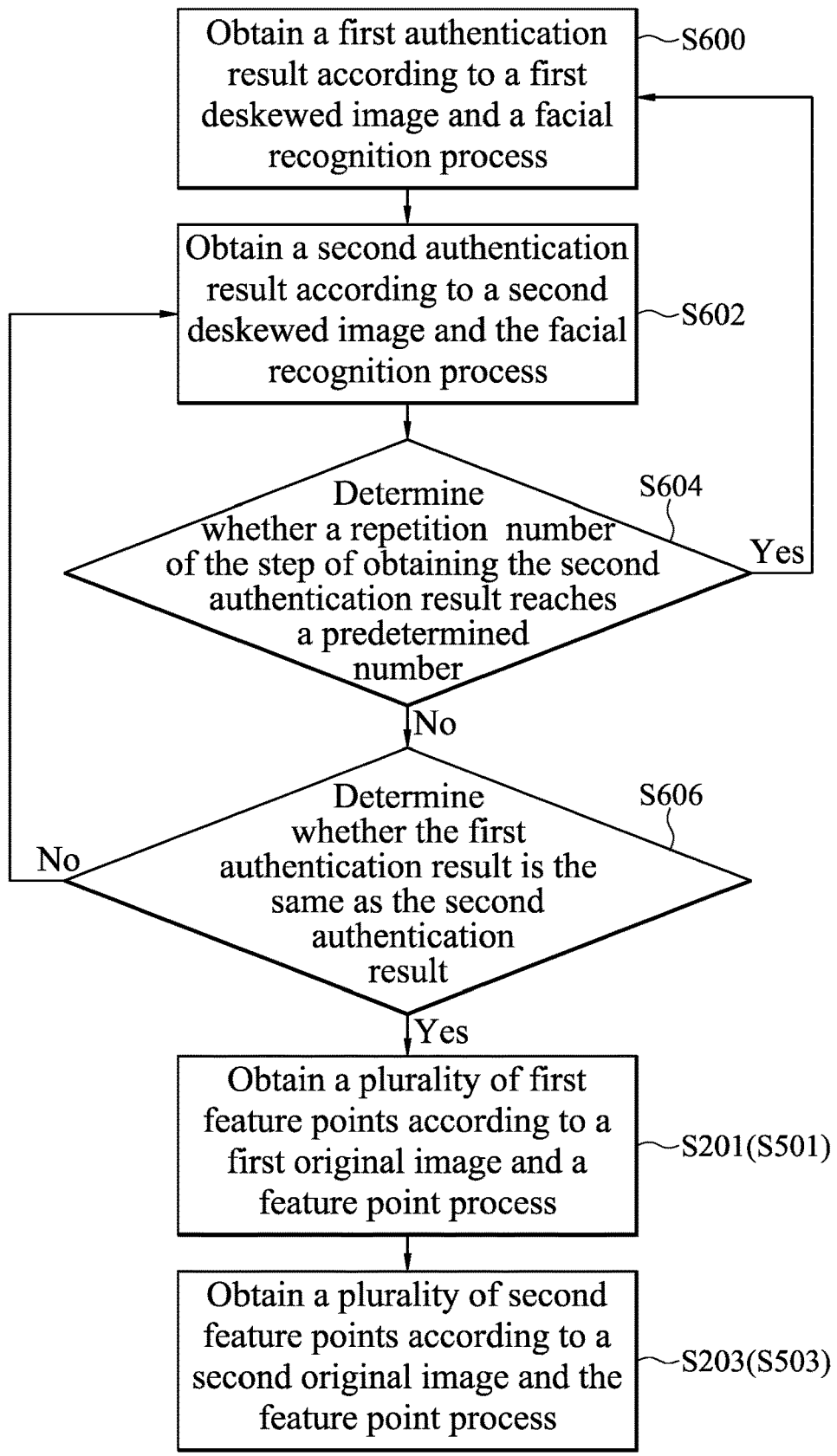
FIG. 7 illustrates a schematic flow diagram of a liveness detection method according to some embodiments of the present application.

Refer to FIG. 7, illustrating a schematic flow diagram of a liveness detection method according to some embodiments of the present application. In some embodiments, when the first authentication result is different from the second authentication result, the processor 13 repeats the step of obtaining the second authentication result (i.e., step S602). For example, the processor 13 reselects another second original image 30 from the frames following the first original image 20, performs the deskew process on the another second original image 30 to generate another second deskewed image, re-performs the facial recognition process on the another second deskewed image to generate a new second authentication result, and performs step S604.

In step S604, the processor 13 determines whether a repetition number of the step of obtaining the second authentication result (i.e., step S602) reaches a predetermined number (step S604). When the repetition number of the step of obtaining the second authentication result has not reached the predetermined number, the processor 13 performs step S606. When the repetition number of the step of obtaining the second authentication result reaches the predetermined number, it represents that it has performed multiple times of determination of step S606 according to multiple second authentication results of the second deskewed images, and the processor 13 repeats the step of obtaining the first authentication result (i.e., step S600). In other words, under the condition that step S606 has been performed multiple times, the first authentication result is still different from the second authentication result. The predetermined number can be stored in the non-transitory storage medium 11 in advance.

For example, under some conditions, a certain user leaves the scene immediately after using the liveness detection system 10, and another user uses the liveness detection system 10 after the previous user leaves the scene. That is to say, in this case, under the same set of frames that were captured, the face of the first deskewed image generated based on the first original image 20 is different from the face of the second deskewed image generated based on the second original image 30, such that the first facial description vector of the first deskewed image served as the first authentication result is different from the second facial description vector of the second deskewed image served as the second authentication result. Therefore, the determination number of step S606 can be limited through step S604, thereby saving the computing resources of the processor 13, and ensuring that the user using the liveness detection system 10 will not change within a certain time.

In some embodiments, when the first authentication result has an authentication failure instruction, the processor 13 repeats the step of obtaining the first authentication result (i.e., step S600). Specifically, when the first authentication result has an authentication failure instruction, it represents that the face in the first deskewed image does not correspond to (photograph from) the face of any one of the registered users. Therefore, the processor 13 repeats step S600 until the first authentication result has a first facial description vector (or the first authentication result does not have an authentication failure instruction). Wherein, the repetition manner of step S600 has been described above, and will not be repeated here. Similarly, when the second authentication result has the authentication failure instruction, the processor 13 repeats the step of obtaining the second authentication result (i.e., step S602). Specifically, when the second authentication result has an authentication failure instruction, it represents that the face in the second deskewed image does not correspond to (photograph from) the face of any one of the registered users. Therefore, the processor 13 repeats step S602 until the second authentication result has a second facial description vector (or the second authentication result does not have an authentication failure instruction). Wherein, the repetition manner of step S602 has been described above, and will not be repeated here.

Figure 8:
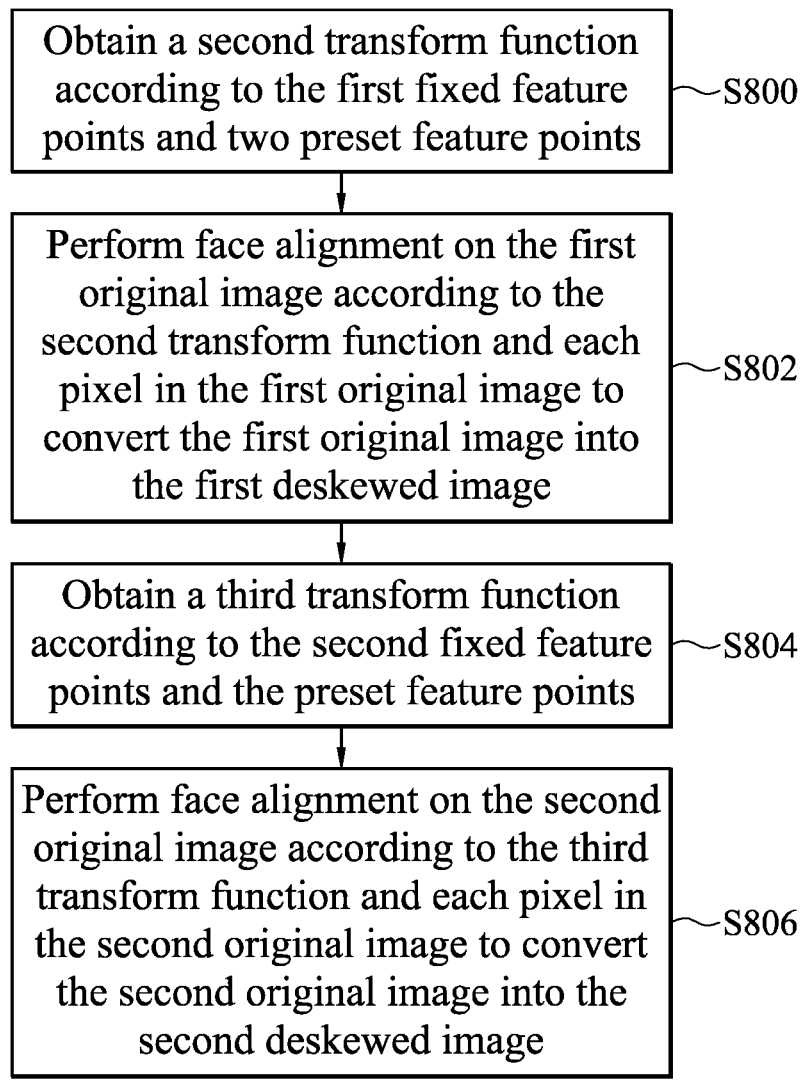
FIG. 8 illustrates a schematic flow diagram of a deskew process according to some embodiments of the present application; and FIG. 9A to FIG. 9C illustrates a schematic diagram of an original image and a deskewed image according to some embodiments of the present application.

Refer to FIG. 8, illustrating a schematic flow diagram of a deskew process according to some embodiments of the present application. In some embodiments, when performing the deskew process, the processor 13 obtains a transform function (hereinafter referred to as a second transform function) according to the first fixed feature points and the two preset feature points (step S800). Specifically, the processor 13 obtains the second transform function according to the coordinates of the first fixed feature points and the preset feature points. That is to say, the coordinates of the first fixed feature points can be converted to the coordinates of the preset feature points through the second transform function. The two preset feature points can be used as alignment points for generating the first deskewed image. The two preset feature points can be designed by the designer and stored in the non-transitory storage medium 11. In some embodiments, two first fixed feature points and two preset feature points correspond to the same facial feature, for example, the two first fixed feature points and two preset feature points both correspond to two eyeballs of the face. Then, the processor 13 performs face alignment on the first original image 20 according to the second transform function and each pixel in the first original image 20 to convert the first original image 20 into the first deskewed image (step S802). For example, the processor 13 converts the coordinates of each pixel of the first original image 20 into new coordinates through the second transform function and arranges each pixel of the first original image 20 according to each new coordinate to form the first deskewed image. In some embodiments, the second transform function may be a similarity transformation matrix.

Similar to steps S800-S802, when performing the deskew process, the processor 13 further obtains a transform function (hereinafter referred to as a third transform function) according to the second fixed feature points and the preset feature points (step S804). Then, the processor 13 performs face alignment on the second original image 30 according to the third transform function and each pixel in the second original image 30 to convert the second original image 30 into the second deskewed image (step S806). In some embodiments, the order of steps S800-S802 and steps S804-S806 may be interchanged.

In some embodiments of step S804, the processor 13 obtains the third transform function according to the coordinates of the second fixed feature points and the preset feature points. That is to say, the coordinates of the second fixed feature points can be converted to the coordinates of the preset feature points through the third transform function. In addition to being used as alignment points for generating the first deskewed image, the two preset feature points can further be used as alignment points for generating the second deskewed image. In some embodiments of step S804, two second fixed feature points and two preset feature points correspond to the same facial feature, for example, the two second fixed feature points and two preset feature points both correspond to two eyeballs of the face. In some embodiments of step S806, the processor 13 converts the coordinates of each pixel of the second original image 30 into new coordinates through the third transform function and arranges each pixel of the second original image 30 according to each new coordinate to form the second deskewed image. In some embodiments, the third transform function may be a similarity transformation matrix.

Figure 9B:
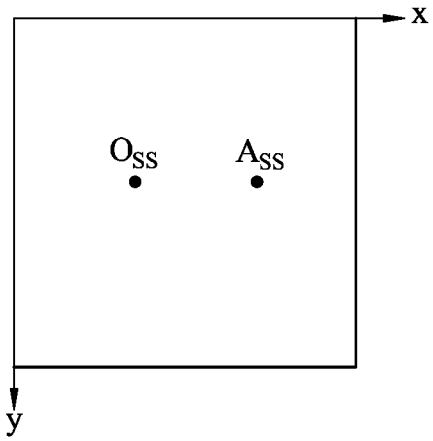
Figure 9C:
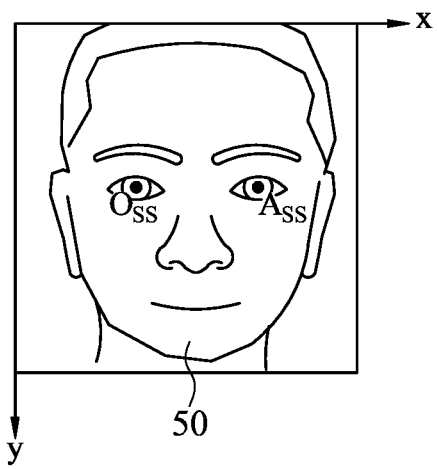

Refer to FIGS. 9A-9C, illustrating a schematic diagram of an original image 40 and a deskewed image 50 according to some embodiments of the present application. It can be seen from FIG. 9A that two fixed feature points $O_{DD}$ and $A_{DD}$ (such as the two first fixed feature points or the two second fixed feature points) can be obtained through performing a feature point process on the original image 40 (such as the first original image 20 or the second original image 30). Next, according to the two fixed feature points $O_{DD}$ and $A_{DD}$ and two preset feature points $O_{SS}$ and $A_{SS}$ (as shown in FIG. 9B), a transform function between the two fixed feature points $O_{DD}$ and $A_{DD}$ and two preset feature points $O_{SS}$ and $A_{SS}$ (such as the second transform function or the third transform function) can be calculated. Then, the deskewed image 50 (such as the first deskewed image or the second deskewed image) (as shown in FIG. 9C) can be generated by converting each pixel in the original image 40 through the transform function.

In some embodiments, the second transform function and the third transform function are substantially the same as the first transform function. For example, in equation 1 to equation 8, $O_S$ and $A_S$ may be the preset feature points, and $O_D$ and $A_D$ may be the two first fixed feature points or the two second fixed feature points. In this way, the computing resources and storage resources of the liveness detection system 10 can be saved. For example, the first transform function, the second transform function, and the third transform function can be implemented only based on a kind of transformation matrix. In some embodiments, since the second transform function and the third transform function are substantially the same as the first transform function and the first transform function is different from the fourth transform function, the second transform function and the third transform function are different from the fourth transform function.

To sum up, according to some embodiments, the first transform function and the fourth transform function can be obtained through a simple operation, and whether a person image to be recognized is a spoofing image can be determined according to the first transform function and the fourth transform function, thereby determining whether the behavior of using photos or videos for spoofing occurs. In other words, while realizing the determination of the spoofing behavior, the computing resources and memory resources required for performing the determination of the spoofing behavior can also be reduced.

What is claimed is:

1. A liveness detection method, implemented in a facial recognition technology, comprising:
obtaining, according to a first image and a feature point process, a plurality of first feature points;
selecting two first fixed feature points and at least one first variable feature point from the plurality of first feature points;
obtaining, according to a second image and the feature point process, a plurality of second feature points;
selecting two second fixed feature points and at least one second variable feature point from the plurality of second feature points;
wherein the variable feature points are more likely to change with expressions than the fixed feature points;
obtaining, according to each pixel of the first fixed feature points and each pixel of the second fixed feature points, a first transform function;
obtaining, according to the first transform function and each pixel of the at least one first variable feature point, at least one check feature point; and
determining, according to the at least one check feature point and the at least one second variable feature point, whether the second image is a spoofing image.

2. The liveness detection method according to claim 1, wherein when a difference degree between the at least one check feature point and the at least one second variable feature point is less than a difference threshold, determining that the second image is the spoofing image.

3. The liveness detection method according to claim 1, wherein the first transform function is $$\overrightarrow{O_D A_D} = \begin{bmatrix} rs0 & -rs1 \\ rs1 & rs0 \end{bmatrix} \left( \overrightarrow{O_S A_S} + \begin{bmatrix} t_x \\ t_y \end{bmatrix} \right)$$

and is substantially the same as $$\begin{bmatrix} dc_x \\ dc_y \end{bmatrix} = \begin{bmatrix} rs0 & -rs1 \\ rs1 & rs0 \end{bmatrix} \begin{bmatrix} sc_x \\ sc_y \end{bmatrix} + \begin{bmatrix} t_x \\ t_y \end{bmatrix},$$

and wherein $O_s$ and $A_s$ are the first fixed feature points, $O_D$ and $A_D$ are the second fixed feature points, $t_x$ is a horizontal translation amount of $O_s$ and $A_s$, $t_y$ is a vertical translation amount of $O_s$ and $A_s$, $$rs0 = \frac{ds_x * dd_x + ds_y * dd_y}{ds_x^2 + ds_y^2}, rs1 = \frac{ds_x * dd_y - ds_y * dd_x}{ds_x^2 + ds_y^2},$$

$ds_x$ is a horizontal component of the vectors of $O_s$ and $A_s$, $ds_y$ is a vertical component of the vectors of $O_s$ and $A_s$, $dd_x$ is a horizontal component of the vectors of the vectors of $O_D$ and $A_D$, $dd_y$ is a vertical component of the vectors of $O_D$ and $A_D$, $dc_x$ is a horizontal coordinate of the at least one check feature point, $dc_y$ is a vertical coordinate of the at least one check feature point, $sc_x$ is a horizontal coordinate of the at least one first variable feature point, and $sc_y$ is a vertical coordinate of the at least one first variable feature point.

4. The liveness detection method according to claim 3, wherein the first transform function is substantially the same as $$\begin{bmatrix} dc_x \\ dc_y \\ 1 \end{bmatrix} = \begin{bmatrix} rs0 & -rs1 & t_x \\ rs1 & rs0 & t_y \\ 0 & 0 & 1 \end{bmatrix} \begin{bmatrix} sc_x \\ sc_y \\ 1 \end{bmatrix}.$$

5. The liveness detection method according to claim 1, further comprising: before obtaining the first fixed feature points and the at least one first variable feature point and before obtaining the second fixed feature points and the at least one second variable feature point, executing:
  obtaining, according to a first deskewed image and a facial recognition process, a first authentication result, wherein the first deskewed image is obtained by performing a deskew process on the first image;
  obtaining, according to a second deskewed image and the facial recognition process, a second authentication result, wherein the second deskewed image is obtained by performing the deskew process on the second image; and
  repeating the step of obtaining the first authentication result when the first authentication result is different from the second authentication result.

6. The liveness detection method according to claim 5, wherein when the first authentication result is the same as the second authentication result, performing the step of obtaining the first fixed feature points and the at least one first variable feature point, and the step of obtaining the second fixed feature points and the at least one second variable feature point.

7. The liveness detection method according to claim 5, wherein when the first authentication result has an authentication failure instruction, repeating the step of obtaining the first authentication result, and when the second authentication result has the authentication failure instruction, repeating the step of obtaining the second authentication result.

8. The liveness detection method according to claim 5, wherein the deskew process comprises:
  obtaining, according to the first fixed feature points and two preset feature points, a second transform function;
  performing, according to the second transform function and each pixel in the first image, a face alignment on the first image to convert the first image into the first deskewed image;
  obtaining, according to the second fixed feature points and the preset feature points, a third transform function; and
  performing, according to the third transform function and each pixel in the second image, the face alignment on the second image to convert the second image into the second deskewed image, wherein the second transform function and the third transform function are substantially the same as the first transform function.

9. The liveness detection method according to claim 1, further comprising:
  obtaining, according to the first feature points and the second feature points, a fourth transform function; and
  determining the second image is a liveness image when the fourth transform function does not meet a predetermined constraint, wherein the predetermined constraint comprises an epipolar constraint and an affine constraint.

10. The liveness detection method according to claim 9, further comprising:
  determining the second image is the spoofing image when the fourth transform function meets any one of the constraints in the predetermined constraint.

11. The liveness detection method according to claim 9, further comprising:
  before obtaining the plurality of first feature points and the plurality of second feature points, performing:
    obtaining, according to a first deskewed image and a facial recognition process, a first authentication result, wherein the first deskewed image is obtained by performing a deskew process on the first image;
    obtaining, according to a second deskewed image and the facial recognition process, a second authentication result, wherein the second deskewed image is obtained by performing the deskew process on the second image;
    performing the steps of obtaining the plurality of first feature points and the plurality of second feature points when the first authentication result is the same as the second authentication result; and
    repeating the step of obtaining the first authentication result when the first authentication result is different from the second authentication result.

12. The liveness detection method according to claim 11, wherein the deskew process comprises:
  obtaining, according to two first fixed feature points in the plurality of first feature points and two preset feature points, a second transform function;
  performing, according to the second transform function and each pixel in the first image, a face alignment on the first image to convert the first image into the first deskewed image;
  obtaining, according to two second fixed feature points in the plurality of second feature points and the preset feature points, a third transform function; and
  performing, according to the third transform function and each pixel in the second image, the face alignment on the second image to convert the second image into the second deskewed image, wherein the second transform function and the third transform function are different from the fourth transform function.

13. A liveness detection system, implemented in a facial recognition technology, comprising:
  a non-transitory storage medium, configured to store a program; and
  a processor, electrically connected to the non-transitory storage medium, configured to load the program to perform the following steps:
    obtaining, according to a first image and a feature point process, a plurality of first feature points;
    selecting two first fixed feature points and at least one first variable feature point from the plurality of first feature points;
    obtaining, according to a second image and the feature point process, a plurality of second feature points;

selecting two second fixed feature points and at least one second variable feature point from the plurality of second feature points;

wherein the variable feature points are more likely to change with expressions than the fixed feature points;

obtaining, according to each pixel of the first fixed feature points and each pixel of the second fixed feature points, a first transform function;

obtaining, according to the first transform function and each pixel of the at least one first variable feature point, at least one check feature point; and determining, according to the at least one check feature point and the at least one second variable feature point, whether the second image is a spoofing image.

14. The liveness detection system according to claim 13, wherein when a difference degree between the at least one check feature point and the at least one second variable feature point is less than a difference threshold, the processor determines that the second image is the spoofing image.

15. The liveness detection system according to claim 13, wherein the first transform function is $$\overrightarrow{O_D A_D} = \begin{bmatrix} rs0 & -rs1 \\ rs1 & rs0 \end{bmatrix} \left( \overrightarrow{O_S A_S} + \begin{bmatrix} t_x \\ t_y \end{bmatrix} \right)$$

and is substantially the same as $$\begin{bmatrix} dc_x \\ dc_y \end{bmatrix} = \begin{bmatrix} rs0 & -rs1 \\ rs1 & rs0 \end{bmatrix} \begin{bmatrix} sc_x \\ sc_y \end{bmatrix} + \begin{bmatrix} t_x \\ t_y \end{bmatrix},$$

and wherein $O_s$ and $A_s$ are the first fixed feature points, $O_D$ and $A_D$ are the second fixed feature points, $t_x$ is a horizontal translation amount of $O_s$ and $A_s$, $t_y$ is a vertical translation amount of $O_s$ and $A_s$, $$rs0 = \frac{ds_x * dd_x + ds_y * dd_y}{ds_x^2 + ds_y^2}, \; rs1 = \frac{ds_x * dd_y - ds_y * dd_x}{ds_x^2 + ds_y^2},$$

$ds_x$ is a horizontal component of the vectors of $O_s$ and $A_s$, $ds_y$ is a vertical component of the vectors of $O_s$ and $A_s$, $dd_x$ is a horizontal component of the vectors of the vectors of $O_D$ and $A_D$, $dd_y$ is a vertical component of the vectors of $O_D$ and $A_D$, $dc_x$ is a horizontal coordinate of the at least one check feature point, $dc_y$ is a vertical coordinate of the at least one check feature point, $sc_x$ is a horizontal coordinate of the at least one first variable feature point, and $sc_y$ is a vertical coordinate of the at least one first variable feature point.

16. The liveness detection system according to claim 13, wherein the first transform function is substantially the same as $$\begin{bmatrix} dc_x \\ dc_y \\ 1 \end{bmatrix} = \begin{bmatrix} rs0 & -rs1 & t_x \\ rs1 & rs0 & t_y \\ 0 & 0 & 1 \end{bmatrix} \begin{bmatrix} sc_x \\ sc_y \\ 1 \end{bmatrix}.$$

17. The liveness detection system according to claim 13, wherein before obtaining the first fixed feature points and the at least one first variable feature point and before obtaining the second fixed feature points and the at least one second variable feature point, the processor performs the following steps:

obtaining, according to a first deskewed image and a facial recognition process, a first authentication result, wherein the first deskewed image is obtained by performing a deskew process on the first image;

obtaining, according to a second deskewed image and the facial recognition process, a second authentication result, wherein the second deskewed image is obtained by performing the deskew process on the second image; and repeating the step of obtaining the first authentication result when the first authentication result is different from the second authentication result.

18. The liveness detection system according to claim 17, wherein when the first authentication result is the same as the second authentication result, the processor performs the step of obtaining the first fixed feature points and the at least one first variable feature point, and the step of obtaining the second fixed feature points and the at least one second variable feature point.

19. The liveness detection system according to claim 17, wherein when the first authentication result has an authentication failure instruction, the processor repeats the step of obtaining the first authentication result, and when the second authentication result has the authentication failure instruction, the processor repeats the step of obtaining the second authentication result.

20. The liveness detection system according to claim 17, wherein the deskew process comprises:

obtaining, according to the first fixed feature points and two preset feature points, a second transform function;

performing, according to the second transform function and each pixel in the first image, a face alignment on the first image to convert the first image into the first deskewed image;

obtaining, according to the second fixed feature points and the preset feature points, a third transform function; and performing, according to the third transform function and each pixel in the second image, the face alignment on the second image to convert the second image into the second deskewed image, wherein the second transform function and the third transform function are substantially the same as the first transform function.

\* \* \* \* \*